Oct. 10, 1933.  T. MOJONNIER  1,929,706
PASTEURIZER
Filed July 31, 1931  5 Sheets-Sheet 1
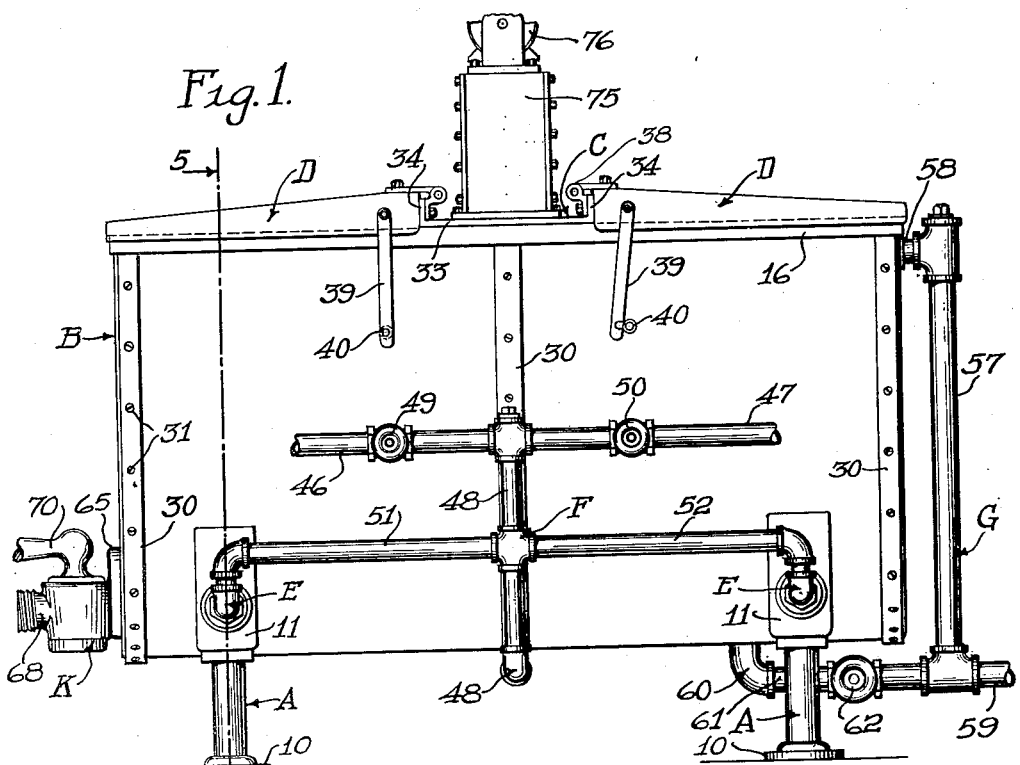
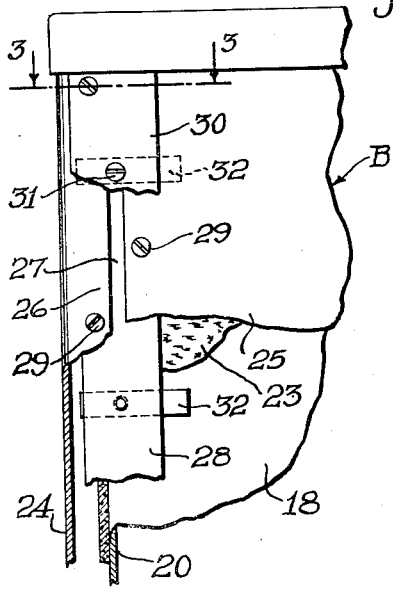
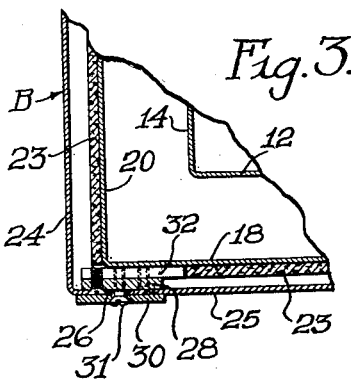
INVENTOR.
Timothy Mojonnier
BY Thomas H. Ferguson
ATTORNEY.

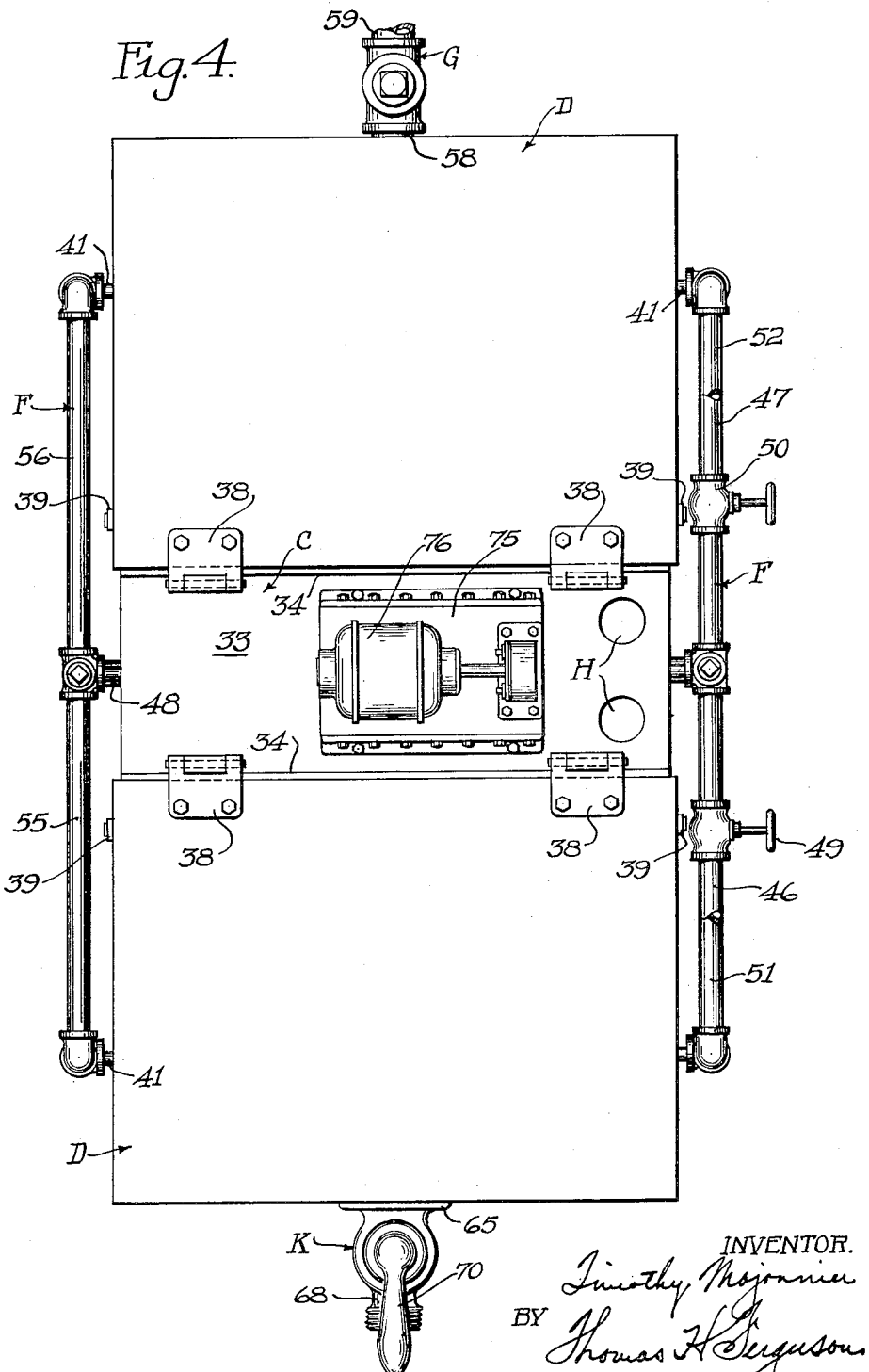

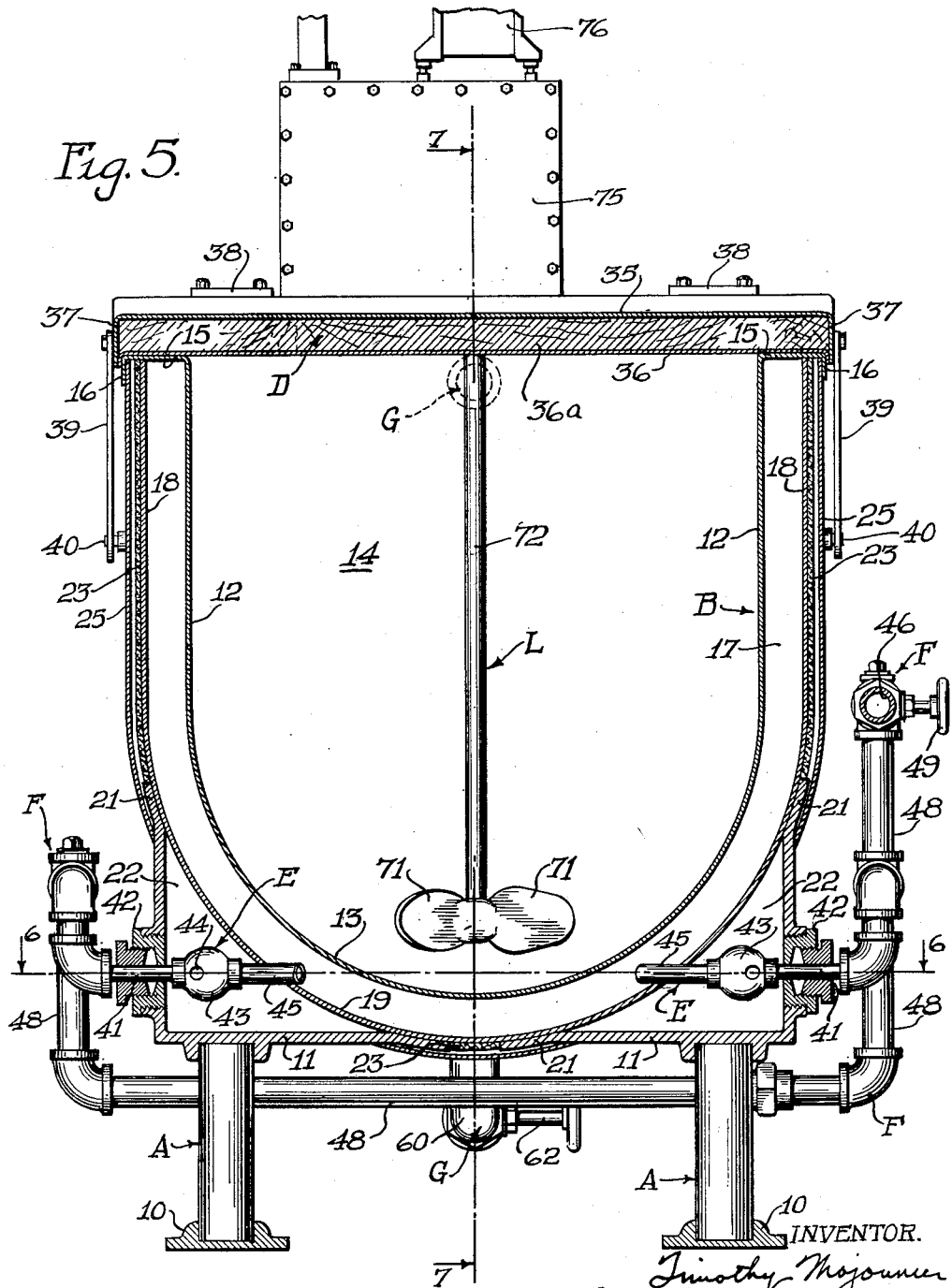

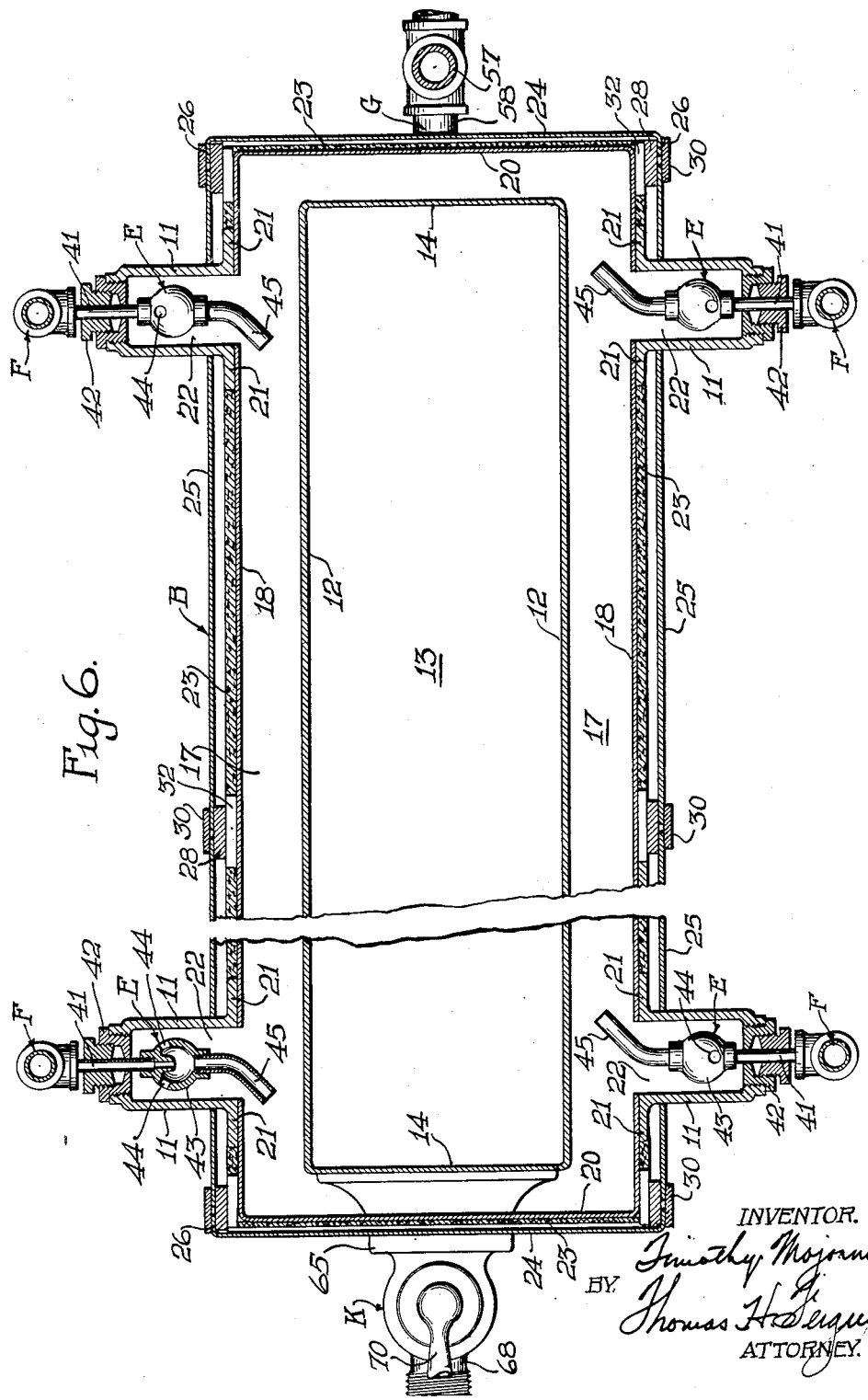

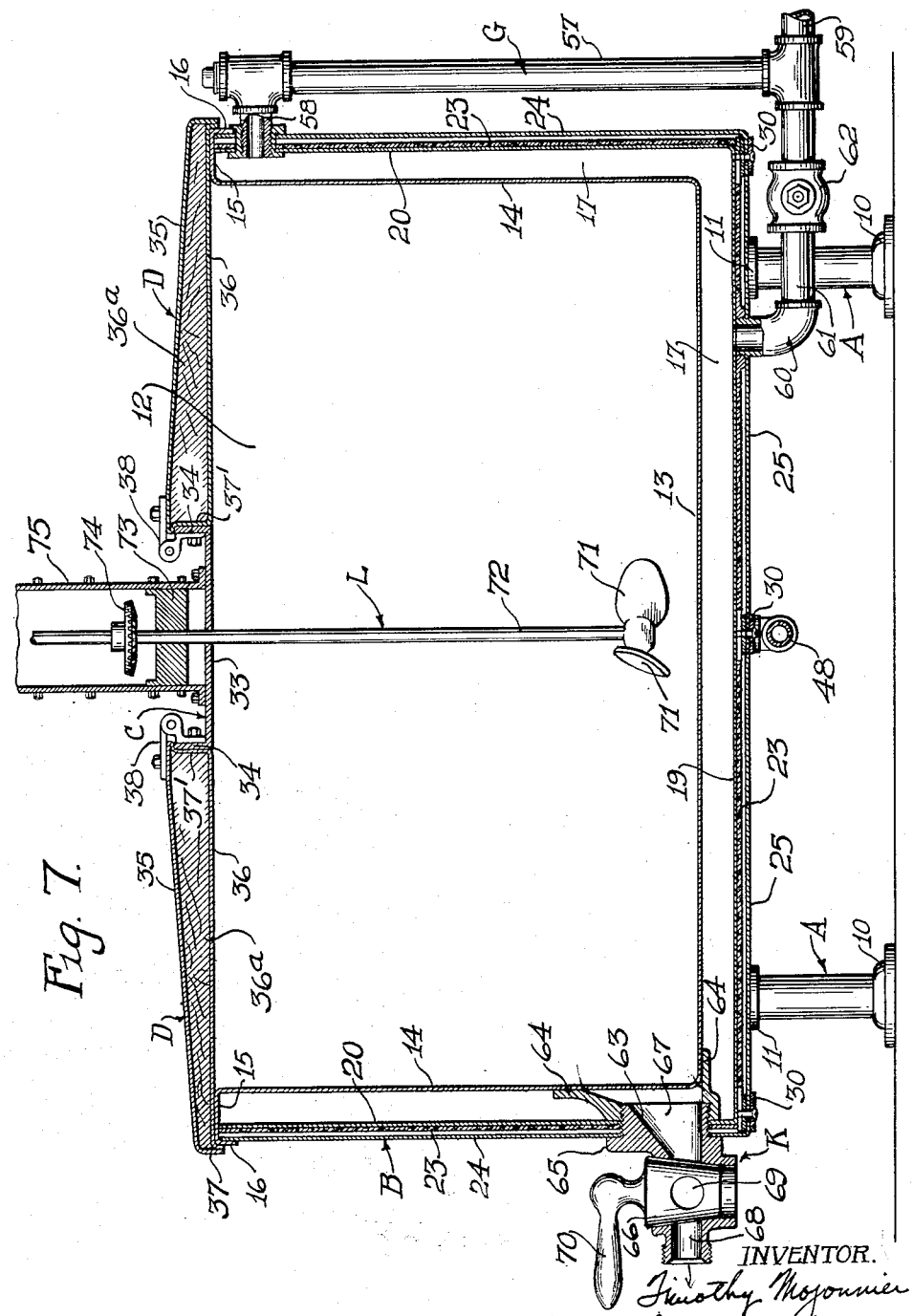

Patented Oct. 10, 1933

1,929,706

UNITED STATES PATENT OFFICE 1,929,706

PASTEURIZER

Timothy Mojonnier, Oak Park, Ill., assignor to Mojonnier Bros. Co., a corporation of Illinois Application July 31, 1931. Serial No. 554,304

7 Claims. (Cl. 257—208)

The present invention relates to pasteurizers and has to do more particularly with the details of construction by which certain advantages in construction and operation are obtained.

Thus, one object of the invention is to so arrange the parts that the milk deposited in the pasteurizer may be more quickly heated than in the pasteurizers of previously known construction.

Another object is to bring about the required circulation of the heating water without the use of an outside pump and driving motor. In attaining this object I employ certain inlets for the water and steam and utilize them in establishing the required water circulation while the milk is kept in motion by a simple agitator.

Another object is to produce a pasteurizer which may be easily and properly cleaned. To this end I do away with the coils so commonly used in prior art pasteurizers and have in lieu thereof only flat and smooth surfaces, that is to say, surfaces which are easy to clean.

Another object is to provide a structure devoid of stuffing boxes and one which shall be low and thus capable of being readily filled by an attendant pouring in the milk at the top.

Another object is to provide a simple structure which may be constructed with milk contacting surfaces of tinned copper, stainless steel or other desirable metal.

Still other objects are to provide a pasteurizer that will be efficient in operation, durable in service and easily and economically manufactured and installed.

These and other objects, features and advantages of the invention will be more fully understood upon reference to the following detailed description taken in connection with the accompanying drawings wherein the preferred form of the invention is fully illustrated. For a measure of the invention reference should be had to the appended claims.

In said drawings, Fig. 1 is a side elevation of a pasteurizer constructed and arranged in accordance with the present invention; Fig. 2 is an enlarged detail view illustrating one corner of the pasteurizer in elevation, showing particularly the manner of uniting certain of the wall members; Fig. 3 is a transverse sectional view illustrating the same members, the plane of section being indicated by the line 3—3 of Fig. 2; Fig. 4 is a plan view of the pasteurizer; Fig. 5 is a transverse vertical section taken on a plane indicated by the line 5—5 of Fig. 1; Fig. 6 is a horizontal section taken on a plane indicated by the line 6—6 of Fig. 5; and Fig. 7 is a longitudinal central vertical section taken on a plane indicated by the line 7—7 of Fig. 5. Throughout these views like characters refer to like parts.

The new pasteurizer consists essentially of the supporting legs A, the body B, the cover supporting bridge C, the hinged covers D, the steam and water inlet devices E, the inlet piping F, the outlet piping G, the milk supply openings H, the milk draw-off valve K, and the agitator L.

The legs or standards A are short posts having the feet 10 at their lower ends and engaging at their upper ends with the under sides of the castings 11 which form part of the body B. Ordinarily there are four legs A and four body castings 11, although, of course, this number may be varied in different sized pasteurizers. The feet 10 rest upon the floor or other support and by reason of the length of the legs access may be had to the under side of the pasteurizer as well as the floor beneath it for the purpose of cleaning the same and thus preserving good sanitary conditions in the place where the pasteurizer is in use.

The body B is composed of spaced inner and outer sheets of metal which provide a water jacket into which water and steam are injected for the purpose of treating the milk in the pasteurizer. These sheets of metal may be composed of different material as circumstances and the judgment of the designer may dictate. The inner metal, however, should be such that it can be easily and readily cleaned and should consist of a material which will have little effect upon the milk. Tinned copper or stainless steel should be used preferably for the inner sheet. The sheet or sheets which compose the inner portion of the wall structure make up the sides 12, the cylindrical bottom 13 and the ends 14. In forming this inner surface a single sheet may be used to form the sides 12 and the bottom 13 and then suitably shaped sheets may be welded thereto to form the ends 14. The upper edges of the sides 12 are bent outward and downward to provide lateral flanges 15 and downward flanges 16. The ends 14 are also similarly shaped and where these flanges meet they are beveled and welded together so as to make a continuous piece throughout including the overhanging flanges 15 and 16. This construction contributes to cleanliness and that degree of sanitation which should always be present where a commodity like milk is being handled. Surrounding the vessel formed by the sides 12, bottom 13, and ends 14, is the water space 17. This space is limited outwardly by a similar vessel comprising the sides 18, cylindrical bottom 19, and ends 20, but this outer vessel differs from the inner one in that the same is cut away to provide for the several castings 11 which rest upon the posts A. At the points where these castings are located the sides 18 and bottom 19 are welded to the flanges 21 of the castings 11. The inner and outer walls thus form a water jacket in which there are pockets 22 provided by the interiors of the castings 11.

The outer vessel comprising the sides 18, bottom 19 and ends 20 is provided on its exterior with a heat insulation. This insulation may consist of any desired material and is preferably in the form of an insulating board or sheet 23 which bears against the outer surface of the outer vessel at those points where it is desired. In the present instance the insulation 23 covers portions of the side walls 18, the ends walls 20 and the bottom 19, but is not shown as covering the castings 11. This insulation is secured to the outer surface of the vessel comprising these parts by the use of a cement or in any other way that may be desired.

Outward of the insulation 23 is a covering made up of ends 24 and strips 25 which form the bottom and side walls of this outer covering. In the embodiment shown the strips 25 are overlapped by the downwardly extending flanges 16. At this point the metal plates 25 may be secured to the flanges 16 in any desired way as by welding. In the instance illustrated the end pieces 24 are provided with short flanges 26 which are bent to lie in line with the sheets 25 as clearly illustrated more particularly in Fig. 3. The flanges 26 and the plates 25 are separated by a narrow space 27 at the points where they come nearest together. In joining these parts I preferably use a strip 28 of metal and extend the same around the sides and bottom of the pasteurizer body just inside of the plates 25 and flanges 26. These bands 28 overlap the contiguous edges of the member 25 and the flanges 26 sufficiently to enable the flanges and plates to be secured to the member 28 by ample securing devices. In the present instances these securing devices are screws 29 which pass through openings in the flanges and plates and into threaded openings in bands 28. Outer covering bands 30 cover up the space 27 between flanges and plates, and in each instance this covering band is secured by screws 31 which pass through openings in the band 30 and through the space 27 between the flange 26 and plate 25 into a threaded opening in the inner band 28. The screws 31 preferably also are screwed into threaded openings in spacers 32 which are in the form of short transverse pieces which fill up the space between the inner bands 28 and the inner wall 18 of the body. The arrangement where two plates 25 come together is the same as just described but the flange 26 is replaced by a plate.

Obviously the outer portion of the pasteurizer body might be covered in a different way than herein shown but what is shown will suffice as an example. From this description of the body B, it will be seen that it has a smooth inner surface and is surrounded by a water jacket having pockets above the pedestals A and that the outside of the water jacket is suitably insulated and covered by a metal covering which may be kept clean with a minimum of effort.

The top of the pasteurizer is provided with covers D which may be opened up so as to allow access to the interior of the pasteurizer for the purposes of cleaning and otherwise treating the same. The cover arrangements may also differ in different installations. In the present case the side walls of the pasteurizer are joined at their centers by the bridge C which in the present instance takes the form of a channel iron 33 having its flanges 34 upturned. The main web of the channel iron is secured to the metal forming the side walls by welding or in any other suitable way. When filling the pasteurizer, it is not necessary in all cases to raise the covers D or either of them, but the milk may be poured into the pasteurizer through the openings H. These openings, as clearly shown, pass through the web of the channel iron 33 and are at a convenient height for the pouring of the milk into the pasteurizer.

The covers D are preferably composed of upper and lower metal plates 35 and 36 with a wood filler 36ª between them and the outer edges are finished by turning the upper plates 35 downward to provide flanges 37 to complete the finish around the ends and sides of the covers. The inner edges are in this instance completed by turning up the plates 36 to provide flanges 37' which reach to the upper plate 35. Obviously instead of the wood filler within the covers D there might be other heat insulating material. The covers are provided with hinges 38 which are connected to the flanges 34 of the channel bar 33 forming the bridge C. Ample space is provided for the turning of the covers into a wide open position. In the present instance hooks 39 freely pivoted at their upper ends to the cover D engage with pins 40 upon the sides of the pasteurizer to secure the covers D in firmly closed position.

The inlet devices E, by which water and steam are admitted into the water space 17, are located in the different pockets 22 which form part of the water jacket. Each of these devices consists of a supply pipe 41 which extends through a gland 42 into the interior of the pocket 22 and the pipe 41 terminates in a globular casing 43 which is threaded on the supply pipe 41 and is supported thereby free of the walls of the casting 11 in which the pocket 22 is located. The casing 43 is provided with a series of lateral openings 44 for the admission of water from the jacket 17, and particularly the adjacent pocket 22. A discharge pipe 45 leads from the inner end of the casing 43 and terminates about in the center of the water jacket space but as clearly shown it is turned to one side in a horizontal direction. The angle through which it is turned is about 45 degrees relative to the axis of the supply pipe 41 and the casing 43. It will also be noted that the pipes 45 on one side of the pasteurizer project in one direction while those on the other side project in the opposite direction. This is clearly shown in Fig. 6. This arrangement of the outlet pipes 45 promotes circulation of the water through the water jacket 17. The structure formed by the supply pipe 41, the outlet pipe 45 and the intervening globular casing 43 with its lateral openings 44 is a water heater of the injector type with which steam may be used without causing pounding.

The connections F by which steam and water are supplied to the inlet devices E include a water supply pipe 46 and a steam supply pipe 47. These connect with a common pipe 48 and the amount of water admitted on the one hand is controlled by a valve 49 while the amount of steam admitted on the other is controlled by the valve 50. The pipe 48 runs as a main supply pipe completely under the body B and up on the other side. On the first side it is provided with branches 51 and 52 and on the other side with similar branches 55 and 56. Thus, mixed steam and water are supplied through the main pipe 48 and the branches 51, 52, 55 and 56 to the four supply devices E and the water which accumulates in the water jacket is amply heated and kept in circulation by the constant injection of steam and water through the angular pipes 45 of these devices.

Obviously, the steam and water may be variously admitted. Instead of admitting mixed water and steam at all of the inlet devices E, in the manner illustrated, it might be desirable in some instances to admit steam at certain of said devices and water at others. But these are variations which may be practiced by the users of the pasteurizer as circumstances and judgment may require or dictate.

The accumulation of water in the water jacket may continue until the entire space 17 is practically filled. When the proper water level is reached in the jacket then the surplus will be carried off through the piping G which includes an upright 57 which is connected near its upper end by a short piece of pipe 58 to the interior of the jacket. The opening through the pipe 58 constitutes an overflow for the water jacket. The lower end of the pipe is suitably connected to a branch 59 which is a discharge pipe from the pasteurizer. In case it becomes necessary to drain the water jacket then the connection formed by the elbow 60 with the short piece of pipe 61 is utilized. This connection provides an outlet to the discharge pipe 59 which is controlled by a suitable valve 62.

As previously pointed out the milk is poured into the pasteurizer through one or both of the openings H in the bridge C. In order to draw off the milk, the draw-off valve K is provided. This valve includes a body 63 which is provided with an inner welding flange 64 and an outer welding or retaining flange 65. The inner flange 64 is welded to the walls and bottom of the inner vessel as clearly shown more particularly in Fig. 7. The outer flange 65 may be similarly attached to the outer portion of the body structure, the connection in such case being made by welding the end member 24 to the flange 65. In this particular valve, the distance from the rotary valve member 66 to the inlet end of the valve body is relatively short, and the bell-mouth opening 67 at said inlet end is relatively wide. The arrangement of all the valve parts together with the dimensions employed are such that the interior of the valve can be readily cleaned. The bell-mouth 67 can be easily cleaned from within the pasteurizer. The valve member 66 can be removed and then access can be had to the passage 68 through which the milk flows. In the position shown, the valve K is fully closed, the opening 69 being at right angles to the passage 68. A handle 70 on the valve member 66 enables the valve to be moved into its different positions. Ordinarily suitable piping will lead from the outlet of the valve to containers for the treated milk.

In order that the liquid being treated in the pasteurizer may be uniformly brought into contact with the heated walls, it is usual to employ an agitator of some sort. In the present instance the agitator L includes the propeller type of stirring blades 71 and these blades are located at the lower end of a vertical shaft 72. The latter is suitably journaled in a bearing member 73 mounted upon the bridge C. The shaft 72 is provided with gearing through which it may be rotated. In the present instance a single gear wheel 74 only is shown. This, however, should suffice as the agitator forms no part of the present invention. The casing 75 is the casing which surrounds the gearing and forms a support for the driving motor 76 which is preferably an electric motor properly geared to drive the stirring shaft 72.

In operation, the milk is supplied through the openings H and steam and water through the piping F and the pasteurizing action is continued for the proper length of time. At the conclusion of the pasteurizing action, the valve K is opened and the milk withdrawn. This operation is repeated for different charges of milk. When it becomes necessary to clean the pasteurizer, the interior can be readily entered through the openings at the top, normally closed by the covers D, and the walls and interior of the outlet valve can be fully cleansed and the pasteurizer made ready for subsequent operation.

In carrying out my invention it will be apparent that certain changes in details shown may be made without departing from the spirit and scope of the invention. I therefore do not wish to be limited to the exact details of the disclosures described but aim to cover by the appended claims all those alterations and modifications that rightly come within the scope of the invention.

I claim:

1. A pasteurizer having a water packet, inlets for supplying steam and water to said jacket, said inlets being located in spaced relation along an orbital path lying substantially in a plane, and outlet means for controlling the water level in said water jacket; the inlets in each instance comprising a supply pipe passing through the outer wall of said jacket, an inclosing casing forming a chamber into which said supply pipe discharges, said casing having lateral openings providing communication between said chamber and water jacket, and a discharge pipe communicating at its intake end with said chamber and terminating at its outer end within said water jacket, all of said discharge pipes discharging in general in a direction lengthwise of said orbital path in said jacket.

2. A pasteurizer comprising a water jacket having a plurality of water pockets located near the base of the pasteurizer, inlet means located respectively in said pockets and operative to supply steam and water to said jacket, and outlet means for controlling the water level in said jacket; said inlet means comprising in the case of each pocket a supply pipe extending through the outer wall of said jacket into the water pocket, a globular casing secured to the end of said supply pipe within said pocket and having lateral openings for the admission of water from said pocket and jacket, and a substantially horizontal discharge pipe leading from said globular casing and discharging into said jacket.

3. A pasteurizer comprising enclosing walls having a cylindrical bottom, a water jacket about said walls provided with water pockets adjacent to the cylindrical portions of said walls, the under walls of said pockets being substantially horizontal, inlet means located respectively in said pockets and operative to supply steam and water to said jacket, outlet means for controlling the water level in said jacket, and supporting pedestals bearing respectively against the said under walls of said pockets; said inlet means comprising in the case of each pocket a supply pipe extending through the outer wall of said jacket into the water pocket, a globular casing secured to the end of said supply pipe within said pocket and having lateral openings for the admission of water from said pocket and jacket, and a discharge pipe leading from said globular casing and discharging into said jacket.

4. A pasteurizer having a water jacket, inlets for supplying steam and water to said jacket, said inlets being located in a plane, and outlet means for controlling the water level in said water jacket; the inlets in each instance comprising a supply pipe passing through the outer wall of said jacket, an inclosing casing forming a chamber into which said supply pipe discharges, said casing having lateral openings providing communication between said chamber and water jacket, and a discharge pipe angularly disposed in said plane and communicating at its intake end with said chamber and terminating at its outer end within said water jacket, all of said discharge pipes discharging in an orbital direction in said jacket.

5. A pasteurizer having a water jacket, inlets for supplying steam and water to said jacket, said inlets being located in spaced relation along an orbital path lying substantially in a horizontal plane near the bottom of said jacket, and outlet means for controlling the water level in said water jacket; the inlets in each instance comprising a supply pipe passing through the outer wall of said jacket, an inclosing casing forming a chamber into which said supply pipe discharges, said casing having lateral openings providing communication between said chamber and water jacket, and a discharge pipe communicating at its intake and with said chamber and terminating at its outer end within said water jacket, all of said discharged pipes discharging in general in a direction lengthwise of said orbital path in said jacket.

6. A pasteurizer comprising a water jacket having a plurality of water pockets located near the base of the pasteurizer in substantially a horizontal plane, inlet means located respectively in said pockets substantially in said plane and operative to supply steam and water to said jacket, and outlet means for controlling the water level in said jacket; said inlet means comprising in the case of each pocket a supply pipe extending through the outer wall of said jacket into the water pocket, an inclosing casing secured to the end of said supply pipe within said pocket and having lateral openings for the admission of water from said pocket and jacket, and a substantially horizontal discharge pipe leading from said casing and discharging into said jacket.

7. A pasteurizer having a water jacket, inlets for supplying steam and water to said jacket, said inlets being located in a substantially horizontal plane near the bottom of said jacket, and outlet means for controlling the water level in said water jacket; the inlets in each instance comprising a supply pipe passing through the outer wall of said jacket, an inclosing casing forming a chamber into which said supply pipe discharges, said casing having lateral openings providing communication between said chamber and water jacket, and a discharge pipe angularly disposed in said plane and communicating at its intake end with said chamber and terminating at its outer end wthin said water jacket, all of said discharge pipes discharging in an orbital direction in said jacket.

TIMOTHY MOJONNIER.